(12) United States Patent
Takanishi et al.

(10) Patent No.: US 7,635,748 B2
(45) Date of Patent: Dec. 22, 2009

(54) RESIN AND ARTICLE MOLDED THEREFROM

(75) Inventors: Keijiro Takanishi, Ritto (JP); Tatsuya Matsuno, Kyoto (JP); Emi Inoue, Otsu (JP); Takehiro Kohara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 2 days.

(21) Appl. No.: 12/000,161

(22) Filed: Dec. 10, 2007

(65) Prior Publication Data

US 2008/0139778 A1    Jun. 12, 2008

Related U.S. Application Data

(63) Continuation of application No. 10/558,275, filed as application No. PCT/JP2004/006953 on May 21, 2004, now abandoned.

(30) Foreign Application Priority Data

May 27, 2003   (JP)   ............................. 2003-148826

(51) Int. Cl.
   *C08G 79/02*   (2006.01)
   *C08G 79/04*   (2006.01)
   *C08G 61/02*   (2006.01)

(52) U.S. Cl. .................. 528/398; 528/86; 528/272; 264/176.1; 264/219; 359/642

(58) Field of Classification Search ................ 528/398, 528/86, 272; 264/176.1, 219; 359/642
See application file for complete search history.

(56) References Cited

U.S. PATENT DOCUMENTS 6,750,313  B2 *   6/2004   Takanishi et al. ........... 528/196

FOREIGN PATENT DOCUMENTS

| EP | 1 270 646 A1 | 1/2003 |
|----|--------------|--------|
| JP | 11-80178 A | 3/1999 |
| JP | 2002-167440 A | 6/2002 |
| JP | 2003-206363 A | 7/2003 |
| JP | 2003-268129 A | 9/2003 |
| JP | 2003-279733 A | 10/2003 |
| WO | 01/34683 A1 | 5/2001 |

* cited by examiner

*Primary Examiner*—Duc Truong
(74) *Attorney, Agent, or Firm*—Kubovcik & Kubovcik

(57) ABSTRACT

The resin of the invention comprises both a phosphorus-containing residue having a bicycloalkyl structure and a specific divalent phenol residue. The invention provides a resin having excellent optical properties, which is colorless and transparent, has a high refractive index and is optically low dispersive, as well as its molded product.

11 Claims, No Drawings

RESIN AND ARTICLE MOLDED THEREFROM

This application is a continuation of U.S. patent application Ser. No. 10/558,275 filed Nov. 23, 2005 now abandoned, which is incorporated herein by reference application Ser. No. 10/558,275 is a 371 of PCT/JP2004/006953 filed May 21, 2004, and claims priority of Japanese patent application No. 2001-148826 filed May 27, 2003, which are incorporated herein by reference.

TECHNICAL FIELD

The present invention relates to a resin excellent in optical properties, which is optically low dispersive and has a high refractive index, as well as its molded product.

BACKGROUND ART

As colorless and transparent materials, various materials have been used in an optical lens, a functional optical film and a disk substrate, depending on various applications, and with rapid development in health care and electronics, functions and performance required of the materials themselves become increasingly accurate and excellent.

In application to health care, an eyeglass lens can be mentioned, and from the viewpoint of thinning, light weight and fashion, active development of materials is made, and for advantages such as impact resistance, light weight etc., resin lenses come to account for 90% of the commercial eyeglass lenses at present.

The resin for conventional eyeglass lenses is divided roughly into 3 kinds of resin, that is, CR39, acrylic resin and urethane resin, and many resins have been developed and practically used to achieve low dispersibility and high refraction. Because all of these resins are thermosetting, cast molding is used in molding thereof into optical lenses, but this method suffers from problems such as long polymerization time and high production costs in a subsequent annealing process etc. Application of thermoplastic resin such as polycarbonate to lenses is advantageous in a significant reduction in production costs with good moldability, as compared with the thermosetting resin, but the thermoplastic resin applied to eyeglasses for eyesight correction is poor in performance because of a low Abbe number (that is, high chromatic aberration due to high dispersibility) and relatively high optical strain. A large number of thermoplastic resins having a higher refractive index than that of polycarbonate are known, but have problems such as high dispersibility, easy coloration etc. and are thus problematic for use in optical lenses.

Various resins containing a phosphorus-based functional group are known, and resins containing a phosphonate group in a main chain thereof are called polyphosphonates and vigorously studied for improvement in functions such as flame retardance. With respect to many of such known polyphosphonate-based resins, there is no detailed knowledge of physical properties such as optical properties and physical properties, and thus the present inventors synthesized such resins and evaluated physical properties thereof. As a result, these known polyphosphonate-based resins are poor in physical properties or poor in refractive index and light dispersibility.

In the Patent Document 1, the optical properties etc. of a phosphonate/carbonate copolymer are described in detail, and the optical properties thereof are improved as compared with those of conventional resin. However, the light dispersibility (Abbe number) of the resin described in the patent application supra cannot be said to be satisfactory for use in optical lenses, so there is need a resin having a high refractive index and a further high Abbe number.

Patent Document 1: European Patent Application No. 1270646A1

DISCLOSURE OF THE INVENTION

Problems to be Solved by the Invention

Summary of Invention

In view of the foregoing background of the related art, the object of the present invention is to provide a resin having excellent optical properties, which is colorless and transparent, has a high refractive index and is optically low dispersive, as well as its molded product.

Means for Solving the Problems

The present invention has the following means to solve the problem. That is, the resin of the present invention includes both a phosphorus-containing residue having a bicycloalkyl structure and a divalent phenol residue represented by the following general formula (1):

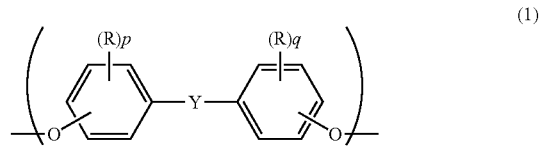

As used herein, the phosphorus-containing residue represents a residue of phosphonic acid, thiophosphoric acid, selenophosphonic acid, phosphonous acid or phosphoric acid. Two or more kinds of these residues may be contained in the resin. In the general formula (1), Rs are independently selected from the group consisting of a hydrogen atom, a C1 to C20 aliphatic hydrocarbon group, a C1 to C20 aromatic hydrocarbon group, a halogen atom and a nitro group. Each of p and q is an integer satisfying the equation: $p+q=0$ to 8. Y is a group selected from the group consisting of an alkylidene group, a branched chain-containing alkylidene group, a cycloalkylidene group and a branched chain-containing cycloalkylidene group. Two or more kinds of divalent phenol residues different in R or Y may be contained in the resin.

Further, the present invention encompasses a molded product such as an optical lens and film comprising the resin.

Effect of the Invention

According to the present invention, there can be provided a resin and a molded product having properties such as high refractive index and low dispersibility.

BEST MODE FOR CARRYING OUT THE INVENTION

The present invention have previously found that the object described above, that is, the thermoplastic resin having excellent optical properties, which is colorless and transparent, has a high refractive index and is optically low dispersible can be obtained by introducing a structure having a pentavalent phosphorus atom, particularly a phosphonic acid structure, into a main chain of the polymer (EP-A-1270646), and the present inventors have made further extensive examination. As a result, they found that by introducing a phosphorus-containing residue having a bicyclo-structure into a main chain of the polymer, the resulting resin can exhibit extremely higher optical properties than by a general phosphonic acid structure having an alkyl group, and the present invention was thereby arrived at.

Among optical properties, the refractive index depends on the degree of polarization inherent in an atomic group and the density of the atomic group, so various structures have been examined to improve the density of an atomic group on a phosphorus atom. As a result, a benzene or naphthalene ring having high carbon density has a high refractive index, but its structure consisting of SP2 carbons is unsatisfactory due to a low Abbe number. Accordingly, a bicycloalkyl structure containing a large number of SP3 carbons in a smaller space was examined, and as a result, this structure exhibited a surprisingly high refractive index and high Abbe number. That is, the bicycloalkyl structure was revealed to be practically extremely effective.

From the viewpoint of incorporating a larger number of SP3 carbons per unit space, the bicycloalkyl structure is preferably a compact structure wherein the number of carbons constituting the ring is 12 (bicyclododecane) or less, particularly 9 (bicyclononane) or less.

With respect to the bonding of the phosphorus atom to the bicycloalkyl structure, the phosphorus atom and the bicycloalkyl skeleton are most preferably bound directly to each other in order to incorporate a larger number of SP3 carbons into the space thereof, but may be bound to each other via an alkylene group such as a methylene group or an ethylene group. From the viewpoint of optical properties, the phosphorus-containing residue having a bicycloalkyl group is more preferably a structure represented by the following general formula (2):

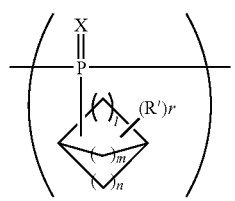

(2)

In the general formula (2), l, m and n independently represent an integer of 1 to 4. When l, m and n are in this range, SP3 carbons can be contained in a large amount per unit space. l, m and n are more preferably 1 to 3. X represents oxygen, sulfur, selenium or a pair of non-covalent electrons.

The position where the phosphorus atom is bound to the bicycloalkyl structure is arbitrary, and this bonding may be bridge-head or bridge. The substituent R' is selected from the group consisting of a hydrogen atom, a C1 to C20 aliphatic hydrocarbon group, a C1 to C20 aromatic hydrocarbon group and a halogen atom, and r is an integer of 0 to 4. When r is an integer of 2 or more, two or more kinds of different substituents R' may be contained in the same bicycloalkyl structure. Two or more kinds of phosphorus-containing residues different in l, m, n, R' or X may be contained in the resin.

Particularly preferable structures of such bicycloalkyl groups include bicyclo[2,2,1]-1-heptyl (1-norbornyl), bicyclo[2,2,1]-2-heptyl (2-norbornyl), bicyclo[2,2,1]-7-heptyl (7-norbornyl), bicyclo[2,2,2]-1-octyl, bicyclo[2,2,2]-2-octyl, bicyclo[3,2,1]-2-octyl, bicyclo[3,2,2]-2-nonyl, bicyclo[4,2,2]-2-decanyl etc. These may be contained alone or in combination of plural kinds thereof. To regulate physical properties and thermal properties, the substituent R' on the bicycloalkyl may be introduced in such a range as not to deteriorate optical properties, but from the viewpoint of incorporation of a larger number of SP3 carbons per unit space, the substituent R' is preferably a compact structure such as a methyl group, an ethyl group or a halogen atom. From the same viewpoint, the number (r) of the substituents is preferably 4 or less, more preferably 2 or less.

To regulate thermal, chemical or physical properties, the resin of the present invention can contain a phosphorus-containing residue represented by the following general formula (3) in addition to the phosphorus-containing residue represented by the general formula (2).

(3)

wherein R" represents an organic group other than the bicycloalkyl group represented by the general formula (2), and X' represents oxygen, sulfur, selenium or a pair of non-covalent electrons.

The following relationship (I) is a relationship showing the copolymerization fraction of the phosphorus-containing residue represented by the general formula (2) to the phosphonic acid residue represented by the general formula (3).

$$1 \geq (a)/\{(a)+(b)\} \geq 0.05 \quad (I)$$

That is, (a) represents the number of moles of the phosphorus-containing residue represented by the general formula (2), and (b) represents the number of moles of the phosphorus-containing residue represented by the general formula (3). When the mol fraction $[(a)/\{(a)+(b)\}]$ of the phosphorus-containing residue represented by the general formula (2) is less than 0.05, the effect of the present invention, that is, the high Abbe number and high refractive index of the resin, is hardly obtained. The mol fraction $[(a)/\{(a)+(b)\}]$ is preferably in the range of 0.25 or more, more preferably 0.4 or more, still more preferably 0.6 or more.

Specific examples of the substituent R" constituting the phosphorus-containing residue represented by the general formula (3) include groups such as phenyl, halo-substituted phenyl, methoxyphenyl, ethoxyphenyl, methyl, ethyl, isopropyl, cyclohexyl, vinyl, allyl, benzyl, aminoalkyl, hydroxyalkyl, halo-substituted alkyl, alkylsulfide etc. Specific examples of such phosphorus-containing residues include residues of methyl phosphonic acid, ethyl phosphonic acid, n-propyl phosphonic acid, isopropyl phosphonic acid, n-butyl phosphonic acid, isobutyl phosphonic acid, t-butyl phosphonic acid, n-pentyl phosphonic acid, neopentyl phosphonic acid, cyclohexyl phosphonic acid, benzyl phosphonic acid, chloromethyl phosphonic acid, dichloromethyl phosphonic acid, bromomethyl phosphonic acid, dibromomethyl phosphonic acid, 2-chloroethyl phosphonic acid, 1,2-dichloroethyl phosphonic acid, 2-bromoethyl phosphonic acid, 1,2-dibromoethyl phosphonic acid, 3-chloropropyl phosphonic acid, 2,3-dichloropropyl phosphonic acid, 3-bromopropyl phosphonic acid, 2,3-dibromopropyl phosphonic acid, 2-chloro-1-methylethyl phosphonic acid, 1,2-dichloro-1-methylethyl phosphonic acid, 2-bromo-1-methylethyl phosphonic acid, 1,2-dibromo-1-methylethyl phosphonic acid, 4-chlorobutyl phosphonic acid, 3,4-dichlorobutyl phosphonic acid, 4-bromobutyl phosphonic acid, 3,4-dibromobutyl phosphonic acid, 3-chloro-1-methylpropyl phosphonic acid, 2,3-dichloro-1-methylpropyl phosphonic acid, 3-bromo-1-methylpropyl phosphonic acid, 2,3-dibromo-1-methyl phosphonic acid, 1-chloromethylpropyl phosphonic acid, 1-chloro-1-chloromethylpropyl phosphonic acid, 1-bromomethylpropyl phosphonic acid, 1-bromo-1-bromomethylpropyl phosphonic acid, 5-chloropentyl phosphonic acid, 4,5-dichloropentyl phosphonic acid, 5-bromopentyl phosphonic acid, 4,5-dibromopentyl phosphonic acid, 1-hydroxymethyl phosphonic acid, 2-hydroxyethyl phosphonic acid, 3-hydroxypropyl phosphonic acid, 4-hydroxybutyl phosphonic acid, 5-hydroxypentyl phosphonic acid, 1-aminomethyl phosphonic acid, 2-aminoethyl phosphonic acid, 3-aminopropyl phosphonic acid, 4-aminobutyl phosphonic acid, 5-aminopentyl phosphonic acid, methylthiomethyl phosphonic acid, methylthioethyl phosphonic acid, methylthiopropyl phosphonic acid, methylthiobutyl phosphonic acid, ethylthiomethyl phosphonic acid, ethylthioethyl phosphonic acid, ethylthiopropyl phosphonic acid, propylthiomethyl phosphonic acid, propylthioethyl phosphonic acid, butylthiomethyl phosphonic acid, phenyl phosphonic acid, 4-chlorophenyl phosphonic acid, 3,4-dichlorophenyl phosphonic acid, 3,5-dichlorophenyl phosphonic acid, 4-bromophenyl phosphonic acid, 3,4-bromophenyl phosphonic acid, 3,5-bromophenyl phosphonic acid, 4-methoxyphenyl phosphonic acid, 3,4-dimethoxyphenyl phosphonic acid, 1-naphthyl phosphonic acid, 2-naphthyl phosphonic acid, 5,6,7,8-tetrahydro-2-naphthyl phosphonic acid, 5,6,7,8-tetrahydro-1-naphthyl phosphonic acid, benzyl phosphonic acid, 4-bromophenylmethyl phosphonic acid, 3,4-dibromophenylmethyl phosphonic acid, 3,5-dibromophenylmethyl phosphonic acid, 2-phenylethyl phosphonic acid, 2-(4-bromophenyl)ethyl phosphonic acid, 2-(3,4-dibromophenyl)ethyl phosphonic acid, 2-(3,5-dibromophenyl)ethyl phosphonic acid, 3-phenylpropyl phosphonic acid, 3-(4-bromophenyl)propyl phosphonic acid, 3-(3,4-dibromophenyl)propyl phosphonic acid, 3-(3,5-dibromophenyl)propyl phosphonic acid, 4-phenylbutyl phosphonic acid, 4-(4-bromophenyl)butyl phosphonic acid, 4-(3,4-dibromophenyl)butyl phosphonic acid, 4-(3,5-dibromophenyl)butyl phosphonic acid, 2-pyridyl phosphonic acid, 3-pyridyl phosphonic acid, 4-pyridyl phosphonic acid, 1-pyrrolidinomethyl phosphonic acid, 1-pyrrolidinoethyl phosphonic acid, 1-pyrrolidinopropyl phosphonic acid, 1-pyrrolidinobutyl phosphonic acid, pyrrole-1-phosphonic acid, pyrrole-2-phosphonic acid, pyrrole-3-phosphonic acid, thiophene-2-phosphonic acid, thiophene-3-phosphonic acid, dithiane-2-phosphonic acid, trithiane-2-phosphonic acid, furan-2-phosphonic acid, furan-3-phosphonic acid, vinyl phosphonic acid, and allyl phosphonic acid. A thiophosphoric acid residue wherein X' is a sulfur atom or a phosphonous acid residue wherein X' is a pair of non-covalent electrons, represented by the general formula (3), can also be mentioned. These can be contained alone or as a mixture of plural kinds thereof.

To regulate thermal, chemical and physical properties or moldability, the resin of the present invention can contain an other acid residue. Examples of such other acid residues include hetero-acid residues of silicon acid, sulfuric acid, boric acid etc., a carbonic acid residue and a divalent carboxylic acid residue. From the viewpoint of chemical stability etc., a carbonic acid residue and a divalent carboxylic acid residue are preferable. These can be contained alone or as a mixture of plural kinds thereof.

The other acid residue such as a hetero-acid residue, a carbonic acid residue or a dicarboxylic acid residue can be contained in the resin of the present invention in the range of the copolymerization fraction of the relationship (II) below, to regulate thermal, chemical and physical properties or moldability.

The following relationship (II) is a relationship showing the copolymerization fraction of the total of the phosphorus-containing residue represented by the general formula (2) and the phosphorus-containing residue represented by the general formula (3) to the other acid residues.

$$1 \geq (c)/\{(c)+(d)\} \geq 0.05 \tag{II}$$

That is, (c) is the number of moles in total of the phosphorus-containing residue represented by the general formula (2) and the phosphorus-containing residue represented by the general formula (3) (number of moles of the total phosphorus-containing residues), and (d) is the number of moles of the other acid residues in total. When the mol fraction of the total phosphorus-containing residues is less than 0.05, the high Abbe number of the resin is not exhibited, and the effect of the present invention is hardly obtained. From the viewpoint of the above effect, the mol fraction of the total phosphorus-containing residues $[(c)/\{(c)+(d)\}]$ is preferably in the range of 0.25 or more, more preferably 0.5 or more, still more preferably 0.75 or more.

In the particularly preferably selected carboxylic acid residue and divalent carboxylic acid residue, the divalent carboxylic acid constituting the divalent carboxylic acid residue includes an aromatic dicarboxylic acid, a linear aliphatic dicarboxylic acid, an alicyclic dicarboxylic acid etc., and specific examples include terephthalic acid, isophthalic acid, biphenyl dicarboxylic acid, dicarboxy diphenyl sulfone, malonic acid, succinic acid, adipic acid, cyclohexane dicarboxylic acid, dodecane diacid, sebacic acid etc. These residues including the carbonic acid residue may be contained alone or as a mixture of plural kinds thereof.

Among the divalent carboxylic acid residues, aliphatic divalent carboxylic acid residues are particularly preferable, and C8 to C20 divalent carboxylic acid residues are more preferable, from the viewpoint of thermal properties and physical properties of the resin. Specific examples include cyclohexane dicarboxylic acid, dodecane diacid and sebacic acid.

From the viewpoint of optical properties, heat resistance and physical properties, the divalent phenol residue is preferably a structural unit whose starting material is aromatic bisphenol, particularly preferably a divalent phenol residue represented by the following general formula (1):

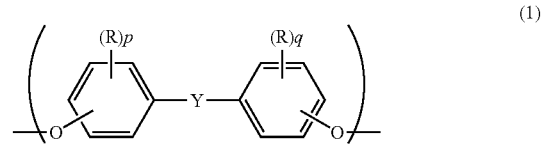

(1)

wherein Rs are independently selected from the group consisting of a hydrogen atom, a C1 to C20 aliphatic hydrocarbon group, a C1 to C20 aromatic hydrocarbon group, a halogen atom and a nitro group. Each of p and q is an integer satisfying the equation: p+q=0 to 8. Y is a group selected from the group consisting of an alkylidene group, a branched chain-containing alkylidene group, a cycloalkylidene group and a branched chain-containing cycloalkylidene group. Two or more kinds of divalent phenol residues different in R or Y may be contained in the resin.

Specific examples of divalent phenols constituting the divalent phenol residues represented by the general formula (1) include 2,2-bis(4-hydroxyphenyl) propane, 2,2-bis(4-hydroxyphenyl)-4-methyl pentane, 1,1-bis(4-hydroxyphenyl) cyclohexane, 1,1-bis(4-hydroxyphenyl)cycloheptane, 1,1-bis(4-hydroxyphenyl)cyclooctane, 1,1-bis(4-hydroxyphenyl)cyclodecane 1,1-bis(4-hydroxyphenyl) cyclododecane, 1,1-bis(4-hydroxyphenyl)-2-ethyl hexane, 1,1-bis(4-hydroxyphenyl)-2-methyl propane, 1,1-bis(3-methyl-4-hydroxyphenyl)cyclohexane, bisphenol fluorene, 1,1-bis(2-methyl-4-hydroxy-5-tert-butylphenyl)-2-methyl propane, 4,4'-[1,4-phenylene-bis(2-propylidene)]-bis(2-methylphenol), 1,1-bis(3-phenyl-4-hydroxyphenyl) cyclohexane, 1,1-bis(4-hydroxyphenyl)-3-methyl-butane, 1,1-bis(4-hydroxyphenyl)cyclopentane, 1,1-bis(3-methyl-4-hydroxyphenyl) cyclopentane, 1,1-bis(3,5-dimethyl-4-hydroxyphenyl)cyclohexane, terpene diphenol, 1,1-bis(3-tert-butyl-4-hydroxyphenyl)cyclohexane, 1,1-bis(2-methyl-4-hydroxy-5-tert-butylphenyl)-2-methyl propane, 1,1-bis(3-cyclohexyl-4-hydroxyphenyl)cyclohexane, 1,1-bis(4-hydroxyphenyl)-3,3,5-trimethyl-cyclohexane, 1,1-bis(4-hydroxyphenyl)-3,3,5,5-tetramethyl-cyclohexane, 1,1-bis(4-hydroxyphenyl)-3,3,4-trimethyl-cyclohexane, 1,1-bis(4-hydroxyphenyl)-3,3-dimethyl-5-ethyl-cyclohexane, 1,1-bis (4-hydroxyphenyl)-3,3,5-trimethyl-cyclopentane, 1,1-bis(3, 5-dimethyl-4-hydroxyphenyl)-3,3,5-trimethyl-cyclohexane, 1,1-bis(3,5-diphenyl-4-hydroxyphenyl)-3,3,5-trimethyl-cyclohexane, 1,1-bis(3-methyl-4-hydroxyphenyl)-3,3,5-trimethyl-cyclohexane, 1,1-bis(3-phenyl-4-hydroxyphenyl)-3,3, 5-trimethyl-cyclohexane, 1,1-bis(3,5-dichloro-4-hydroxyphenyl)-3,3,5-trimethyl-cyclohexane, 9,9-bis(4-hydroxyphenyl) fluorene, 9,9-bis(3,5-dimethyl-4-hydroxyphenyl) fluorene, 1,1-bis(3,5-dibromo-4-hydroxyphenyl)-3,3,5-trimethyl-cyclo hexane, α,α'-bis(4-hydroxyphenyl)-1,4-diisopropyl benzene etc. These can be contained alone or as a mixture of plural kinds thereof. These divalent phenols can be used depending on the performance of the resulting resin.

From the viewpoint of optical properties, heat resistance and physical properties, among these divalent phenols, particularly preferable divalent phenols are selected from those represented by the general formula (1) wherein Y is a branched chain-containing alkylidene group, a cycloalkylidene group, a branched chain-containing cycloalkylidene group and a bicycloalkylidene group, and particularly preferable examples are 1,1-bis(4-hydroxyphenyl)cyclohexane, 1,1-bis(4-hydroxyphenyl)cyclooctane, 1,1-bis(4-hydroxyphenyl)cyclododecane 1,1-bis(4-hydroxyphenyl)-4-methyl cyclohexane, 1,1-bis(4-hydroxyphenyl)-4-isopropyl cyclohexane, 2,2-bis(4-hydroxyphenyl)-4-methyl pentane, 1,1-bis (4-hydroxyphenyl)-3,3,5-trimethyl cyclohexane, and 2,2-bis (4-hydroxyphenyl) norbornane.

Further, dihydroxy benzene can be used in such a range that the effect of the present invention is not deteriorated. The dihydroxy benzene includes resorcinol, hydroquinone, 1,2-dihydroxy benzene etc. These may be contained alone or as a mixture of plural kinds thereof.

The resin of the present invention is not always necessary to be linear, and can be copolymerized with polyvalent phenols, depending on the performance of the resulting resin. Specific examples of such polyvalent phenols include tris(4-hydroxyphenyl)methane, 4,4'-[1-[4-[1-(4-hydroxyphenyl)-1-methylethyl]phenyl]ethylidene]bisphenol, 2,3,4,4'-tetrahydroxy benzophenone, 4-[bis(4-hydroxyphenyl)methyl]-2-methoxyphenol, tris(3-methyl-4-hydroxyphenyl)methane, 4-[bis(3-methyl-4-hydroxyphenyl)methyl]-2-methoxy phenol, 4-[bis(3,5-dimethyl-4-hydroxyphenyl)methyl]-2-methoxy phenol, 1,1,1-tris(4-hydroxyphenyl)ethane, 1,1,1-tris(3-methyl-4-hydroxyphenyl)ethane, 1,1,1-tris(3,5-dimethyl-4-hydroxyphenyl)ethane, tris(3-methyl-4-hydroxyphenyl) methane, tris(3,5-dimethyl-4-hydroxyphenyl)methane, 2,6-bis[(2-hydroxy-5-methylphenyl)methyl]-4-methyl phenol, 4-[bis(3,5-dimethyl-4-hydroxyphenyl)methyl]-1,2-dihydroxy benzene, 2-[bis(2-methyl-4-hydroxy-5-cyclohexylphenyl)methyl]-phenol, 4-[bis(2-methyl-4-hydroxy-5-cyclohexylphenyl)methyl]-1,2-dihydroxy benzene, 4-methylphenyl-1,2,3-trihydroxy benzene, 4-[(4-hydroxyphenyl)methyl]-1,2,3-trihydroxy benzene, 4-[1-(4-hydroxyphenyl)-1-methyl-ethyl]-1,3-dihydroxy benzene, 4-[(3,5-dimethyl-4-hydroxyphenyl)methyl]-1,2,3-trihydroxy benzene, 1,4-bis[1-bis(3,4-dihydroxyphenyl)-1-methyl-ethyl]benzene, 1,4-bis[1-bis(2,3,4-trihydroxyphenyl)-1-methyl-ethyl]benzene, 2,4-bis[(4-hydroxyphenyl)methyl]-1,3-dihydroxy benzene, 2-[bis(3-methyl-4-hydroxyphenyl) methyl]phenol, 4-[bis(3-methyl-4-hydroxyphenyl)methyl] phenol, 2-[bis(2-methyl-4-hydroxyphenyl)methyl]phenol, 4-[bis(3-methyl-4-hydroxyphenyl)methyl]-1,2-dihydroxy benzene, 4-[bis(4-hydroxyphenyl)methyl]-2-ethoxy phenol, 2-[bis(2,3-dimethyl-4-hydroxyphenyl)methyl]phenol, 4-[bis (3,5-dimethyl-4-hydroxyphenyl)methyl]phenol, 3-[bis(3,5-dimethyl-4-hydroxyphenyl)methyl]phenol, 2-[bis(2-hydroxy-3,6-dimethylphenyl)methyl]phenol, 4-[bis(2-hydroxy-3,6-dimethylphenyl)methyl]phenol, 4-[bis(3,5-dimethyl-4-hydroxyphenyl)methyl]-2-methoxy phenol, 3,6-[bis(3,5-dimethyl-4-hydroxyphenyl)methyl]-1,2-dihydroxy benzene, 4,6-[bis(3,5-dimethyl-4-hydroxyphenyl)methyl]-1, 2,3-trihydroxy benzene, 2-[bis(2,3,6-trimethyl-4-hydroxyphenyl)methyl]phenol, 2-[bis(2,3,5-trimethyl-4-hydroxyphenyl)methyl]phenol, 3-[bis(2,3,5-trimethyl-4-hydroxyphenyl)methyl]phenol, 4-[bis(2,3,5-trimethyl-4-hydroxyphenyl)methyl]phenol, 4-[bis(2,3,5-trimethyl-4-hydroxyphenyl)methyl]-1,2-dihydroxy benzene, 3-[bis(2-methyl-4-hydroxy-5-cyclohexylphenyl)methyl]phenol, 4-[bis(2-methyl-4-hydroxy-5-cyclohexylphenyl)methyl] phenol, 4-[bis(2-methyl-4-hydroxy-5-cyclohexylphenyl) methyl]-2-methoxy phenol, 2,4,6-[tris(4-hydroxyphenylmethyl)-1,3-dihydroxy benzene, 1,1,2,2-tetra(3-methyl-4-hydroxyphenyl)ethane, 1,1,2,2-tetra(3,5-dimethyl-4-hydroxyphenyl)ethane, 1,4-[[bis(4-hydroxyphenyl)methyl]] benzene, 1,4-di[bis(3-methyl-4-hydroxyphenyl) methyl] benzene, 1,4-di[bis(3,5-dimethyl-4-hydroxyphenyl)methyl] benzene, 4-[1,1-bis(4-hydroxyphenyl)ethyl]aniline, (2,4-dihydroxyphenyl) (4-hydroxyphenyl) ketone, 2-[bis(4-hydroxyphenyl)methyl]phenol, 1,3,3-tri(4-hydrophenyl) butane etc. These may be contained alone or as a mixture of plural kinds thereof.

The Abbe number (vd) of the resin of the present invention is preferably 32 or more. The Abbe number (vd) is one indicator showing the degree of light dispersion of an optical substance and defined generally by the following equation (III):

$$\text{Abbe number}(vd) = (nd-1)/(nf-nc) \quad \text{(III)}$$

wherein nd is a d-line (wavelength 587.6 nm) refractive index, nf is a f line (wavelength 486.1 nm) refractive index, and nc is a c line (wavelength 656.3 nm) refractive index.

That is, a larger Abbe number is indicative of lower dispersion. For example, the Abbe number of the resin used in an eyeglass lens is preferably 33 or more, more preferably 34 or more.

The refractive index at each wavelength is a value inherent in each substance, and accordingly the Abbe number is a value inherent in each substance. That is, the refractive index does not vary depending on its measurement method, and a measurement method suitable for the shape of its molded product can be selected. A more highly accurate measurement method is preferable, and for example there is a minimum deviation method.

Usually, there is a negative correlation between the Abbe number and refractive index, so both the properties are hardly simultaneously improved. The resin of the present invention is a resin having a high Abbe number while maintaining a refractive index equal to, or higher than, that of conventional polycarbonate.

The resin of the present invention preferably has a high refractive index for use in optical uses, particularly lenses. The refractive index (nd), measured with d line (wavelength: 587.6 nm), is preferably 1.58 or more, more preferably 1.59 or more.

However, there is a negative correlation between the Abbe number and refractive index as described above. Even if its refractive index is high, a resin is not preferable for optical uses, particularly lenses insofar as its Abbe number is too low. That is, there is a suitable range for the respective characteristic values. It is particularly important for use in lenses that the value represented by the formula (IV) with respect to the Abbe number (vd) and d line refractive index (nd) is 210.5 or more. The formula (IV) is a formula showing a range in which both the Abbe number (vd) and d line refractive index (nd) are preferable. The value represented by the formula (IV) is preferably higher, more preferably 211 or more.

$$(vd)+112\times(nd) \qquad (IV)$$

Hereinafter, the method of producing the resin of the present invention and the method of molding the same are described.

As a polymer precursor from which the phosphorus-containing residue having bicycloalkyl, the corresponding acid halide or ester is used. As the method of synthesizing it, methods involving Diels-Alder reaction of a phosphorus-containing vinyl derivative with various cyclic diene compounds and subsequent hydrogenation reaction are known (Phosphorus, Sulfur and Silicon and Related Elements, No. 123, p. 35 (1997)), and such known methods can be used. That is, a bicycle[2,2,1]-2-heptyl phosphonic acid derivative, for example, can be obtained by Diels-Alder reaction of cyclopentadiene with a vinyl phosphonic acid derivative and subsequent hydrogenation reaction, and a bicycle[2,2,2]-2-octyl phosphonic acid derivative can be obtained by Diels-Alder reaction of cyclohexadiene with a vinyl phosphonic acid derivative and subsequent hydrogenation reaction.

The method of producing the resin of the present invention includes a solution polymerization method which involves reacting an acid halide with a divalent phenol in an organic solvent (A. Conix, Ind. Eng. Chem. 51147, 1959; JP-B 37-5599), a melt polymerization method which involves heating an acid halide and a divalent phenol in the presence of a catalyst such as magnesium chloride, a melt polymerization method which involves heating a divalent acid and a divalent phenol in the presence of diallyl carbonate (JP-B 38-26299), an interfacial polymerization method that involves mixing a divalent acid halide dissolved in a water-incompatible organic solvent and a divalent phenol dissolved in an aqueous alkali solution (W. M. EARECKSON, J. Poly. Sci. XL399, 1959; JP-B 40-1959) etc., among which the solution polymerization method is preferably used. By way of example, the resin of the present invention can be obtained by the solution polymerization method which includes mixing a phosphonic acid derivative as a precursor molecule, in the case of a phosphonic acid residue, with a divalent phenol in the presence of a base such as triethylamine and then adding a precursor molecule of a carbonic acid residue or a divalent carboxylic acid, such as phosgene, triphosgene or a divalent carboxylic acid derivative, followed by condensation polymerization thereof. As the phosphonic acid derivative, carbonate derivative or divalent carboxylic acid derivative, its halide, acid anhydride, ester etc. are used, and their type and the order in which these are allowed to act on the divalent phenol are not particularly limited. The method of regulating the molecular weight of the resin of the present invention can be carried out by adding a monofunctional substance at the time of polymerization. The monofunctional substance used as a molecular-weight regulator referred to herein includes monovalent phenols such as phenol, cresol, p-tert-butyl phenol etc. and monovalent acid chlorides such as benzoic chloride, methane sulfonyl chloride, phenyl chloroformate etc.

Various antioxidants based on hindered phenol, hindered amine, thioether, or phosphorus can be added to the resin of the present invention in such a range that its properties are not deteriorated.

The resin according to the present invention can be used as a molding material after blending with another resin in such range that the desired effect is not deteriorated. Examples of such resin blended include polycarbonate, polyethylene, polypropylene, polystyrene, ABS resin, polymethylmethacrylate, polytrifluoroethylene, polytetrafluoroethylene, polyacetal, polyphenylene oxide, polybutylene terephthalate, polyethylene terephthalate, polyamide, polyimide, polyamide imide, polyether imide, polysulfone, polyether sulfone, p-oxybenzoyl-based polyester, polyarylate, polysulfide etc.

The resin of the present invention has high solubility in an organic solvent, and such solvent includes methylene chloride, chloroform, 1,1,2,2-tetrachloroethane, 1,2-dichloroethane, tetrahydrofuran, 1,4-dioxane, toluene, xylene, γ-butyrolactone, benzyl alcohol, isophorone, chlorobenzene, dichlorobenzene, hexafluoroisopropanol etc. The resin of the present invention is non-crystalline, and whether the resin is non-crystalline can be determined by confirming whether its melting point is present or not by a known method, for example by differential scanning calorimetry (DSC) or dynamic viscoelasticity measurement.

For the method of analyzing the constituent components in the resin of the present invention, a method of using a nuclear magnetic resonance spectrum is preferable, and particularly a substituent on the phosphorus atom in the phosphorus-containing residue is analyzed preferably by proton or phosphorus atom nuclear magnetic resonance. When the accuracy of identification of the resin itself by its spectrum is not satisfactory, the resin of the present invention is hydrolyzed with an alkali or the like and decomposed into monomer components, and then each component can be quantitatively or qualitatively analyzed. For example, the resin of the present invention is treated with an excess of a strong base such as an alkali metal alcoholate in an anhydrous alcohol, whereby the divalent phenol residue is decomposed into a divalent phenol, and each acid residue is decomposed into an ester corresponding to the alcoholate ion. These are low-molecular products and can thus be quantified and separated by high-performance liquid chromatography and then subjected to detailed structural analysis by nuclear magnetic resonance spectrum etc.

The method of obtaining a molded product such as a lens from the resin of the present invention is not particularly limited, and may be a known method, for example injection molding, press molding, compression molding, transfer molding, laminate molding and extrusion molding. In molding into a film, a solution film manufacturing method and a melt extrusion film manufacturing method can be mentioned, and particularly solution film manufacturing is preferably used. In the solution film manufacturing method, the above-mentioned organic solvent can be suitably used, and the organic solvent used in molding is preferably a halogen-containing solvent, more preferably methylene chloride.

The resin of the present invention is thermoplastic and thus easily moldable. Its lens has a high Abbe number and high refractive index, and can thus provide an optically excellent lens with low chromatic aberration. The film using the resin of the present invention has excellent optical properties (colorless, transparent and low light-dispersible), has excellent affinity for various solvents, is thus excellent in surface processability, and can provide an excellent functional film or base film in high-functional film members required in liquid crystal displays etc.

EXAMPLES

Hereinafter, specific embodiments of the present invention are described by reference to the Examples, but the present invention is not limited thereto.

Synthesis and evaluation of the resin were conducted by the following methods.

[Synthesis]

According to the formulations shown in Table 1, each resin in Examples 1 to 16 and Comparative Examples 1 to 3 was synthesized. The synthesis method is described by reference to a method of synthesizing the formulation in Example 11.

In a nitrogen atmosphere, a starting material A (1,1-bis(4-hydroxyphenyl)cyclohexane, 80 mmol) and triethyl amine (168 mmol) were mixed with methylene chloride (40 ml) and stirred under cooling on ice. A solution (5 mol/L) of a starting material B (2-norbornyl phosphonic dichloride, 28 mmol) in methylene chloride was added dropwise to the solution over 15 minutes, and thereafter the mixture was stirred at room temperature for 60 minutes. Subsequently, a solution (5 mol/L) of a starting material C (phenyl phosphonic dichloride, 36 mmol) in methylene chloride was added thereto dropwise over 15 minutes, and thereafter the mixture was stirred at room temperature for 60 minutes. Further, a solution (5 mol/L) of a starting material D (sebacic dichloride, 8 mmol) in methylene chloride was added thereto dropwise over 15 minutes, and thereafter the mixture was stirred at room temperature for 60 minutes. Thereafter, a solution (0.6 mol/L) of triphosgene (8 mmol in terms of phosgene) in methylene chloride was added thereto dropwise over 15 minutes, and thereafter the mixture was stirred at room temperature for 60 minutes. Subsequently, the reaction solution was passed through a filter paper having a pore diameter of 0.5 μm to remove solid components, and the filtrate was washed several times with a mixed solution of 80 ml of 0.1 N aqueous hydrochloric acid and 300 ml purified water. Thereafter, an organic layer was separated therefrom, then re-precipitated by introducing it into 2000 ml ethanol, and filtered to collect a polymer. The formed solid polymer was washed with (1) 1000 ml ethanol, (2) 1000 ml mixed solution of water/ethanol=1/1, and (3) 1000 ml water in this order, and then dried to give the objective resin powder in 95% yield.

The resins in the other Examples and Comparative Examples were synthesized in the same manner as above except that the amount of the starting materials added were changed so as to give each formulation shown in Table 1.

[Molding]

The resulting resin powder was molded and evaluated in the following methods. That is, a plate-shaped molded product was produced by press molding. The resulting resin powder was introduced into a mold heated at 250° C. higher than the glass transition temperature of the resin, and then pressurized at a pressure of 2 tons, and the mold was cooled and partitioned, whereby a disk-shaped resin molded product of φ30 mm and 3 mm in thickness was obtained.

For measurement of optical properties, the resulting resin molded product was cut to produce two faces perpendicular to each other, and both the faces were mirror-finished by polishing with a buff.

Alternatively, the resulting resin powder can be formed into a film by the following method and measured for refractive index. That is, in the case of solution casting film manufacturing, the resin is dissolved in chloroform to prepare a dope having a polymer solids content of 5% by weight. This dope was used to form a film on a glass plate and dried at 40° C. for 12 hours under vacuum and then at 100° C. or more at normal pressures for 2 hours to give a cast film.

[Molecular Weight]

The resin powder was dissolved in chloroform to form 0.2 wt % solution, which was then measured by GPC (gel permeation chromatography) [GPC8020 manufactured by Tosoh], to determine the number-average molecular weight (Mn). The molecular weight was determined using polystyrene as the standard.

[Thermal properties: Glass Transition Point]

The glass transition temperature was determined by DSC (SSC5200 manufactured by Seiko Instruments Inc.).

[Optical Properties]

The Abbe number and refractive index were measured in the following method. That is, the molded product in the case of a plate form was evaluated by a refractometer (KPR-2 manufactured by Kalnew Kogyo Co., Ltd.), and the d line (wavelength: 587.6 nm) refractive index (nd) and the Abbe number (νd) determined by the formula (III) were measured. The molded product formed into a thin film was measured by an Abbe refractometer (4T manufactured by Atago Co., Ltd.).

The properties of each resin in the Examples and Comparative Examples are shown in Table 2.

TABLE 1

| Table 1 | | | | General formula (1) | | | General formula (2) | | | | | | General formula (3) | | | |
|---|---|---|---|---|---|---|---|---|---|---|---|---|---|---|---|---|
| | | R | Y | Monomer name | X | R' | l | m | n | Monomer name | Copolymerization ratio (%) | X' | R'' | Monomer name | Copolymerization ratio (%) |
| Examples | 1 | H | c-hex | M1 | O | H | 1 | 2 | 2 | M3 | 100 | — | — | — | — |
| | 2 | H | c-hex | M1 | O | H | 1 | 2 | 2 | M3 | 80 | O | Ph | M6 | 20 |
| | 3 | H | c-hex | M1 | O | H | 1 | 2 | 2 | M3 | 60 | O | Ph | M6 | 40 |
| | 4 | H | c-hex | M1 | O | H | 1 | 2 | 2 | M3 | 75 | — | — | — | — |
| | 5 | H | c-hex | M1 | O | H | 1 | 2 | 2 | M3 | 60 | — | — | — | — |
| | 6 | H | c-hex | M1 | O | H | 1 | 2 | 2 | M3 | 70 | O | c-hex | M7 | 15 |
| | 7 | H | c-hex | M1 | O | H | 1 | 2 | 2 | M3 | 50 | — | — | — | — |

TABLE 1-continued

| Table 1 | | R | Y | Monomer name | General formula (2) X | R' | l | m | n | Monomer name | Copolymerization ratio (%) | General formula (3) X' | R" | Monomer name | Copolymerization ratio (%) |
|---|---|---|---|---|---|---|---|---|---|---|---|---|---|---|---|
| | 8 | H | c-hex | M1 | O | H | 1 | 2 | 2 | M3 | 45 | — | — | — | — |
| | 9 | H | c-hex | M1 | O | H | 1 | 2 | 2 | M3 | 40 | — | — | — | — |
| | 10 | H | c-hex | M1 | O | H | 1 | 2 | 2 | M3 | 5 | O | Ph | M6 | 45 |
| | 11 | H | c-hex | M1 | O | H | 1 | 2 | 2 | M3 | 35 | O | Ph | M6 | 45 |
| | 12 | H | c-hex | M1 | S | H | 1 | 2 | 2 | M4 | 40 | — | — | — | — |
| | 13 | H | c-hex | M1 | S | H | 1 | 2 | 2 | M4 | 75 | — | — | — | — |
| | 14 | H | c-hex | M1 | O | H | 1 | 2 | 3 | M5 | 80 | — | — | — | — |
| | 15 | H | i-pro | M2 | O | H | 1 | 2 | 2 | M3 | 15 | O | Ph | M6 | 65 |
| | 16 | H | i-pro | M2 | O | H | 1 | 2 | 2 | M3 | 40 | O | Ph | M6 | 40 |
| Comparative Examples | 1 | H | c-hex | M1 | — | — | — | — | — | — | — | O | Ph | M6 | 75 |
| | 2 | H | c-hex | M1 | — | — | — | — | — | — | — | — | — | — | — |
| | 3 | H | c-hex | M1 | — | — | — | — | — | — | — | O | c-hex | M7 | 100 |

Y:
c-hex: cyclohexylidene
i-pro: isopropylidene

Monomer name:
M1: 1,1-bis(4-hydroxyphenyl) cyclohexane
M2: 2,2-bis(4-hydroxyphenyl) propane
M3: 2-norbornyl phosphonic dichloride
M4: 2-norbornyl thiophosphonic dichloride
M5: 2-bicyclo[3.2.1]octyl phosphonic dichloride
M6: phenyl phosphonic dichloride
M7: cyclohexyl phosphonic dichloride
M8: dodecane diacid dichloride

TABLE 2

Table 1 (following the previous table)

| | | Divalent carboxylic acid Monomer name | Copolymerization ratio (%) | Carbonic acid Monomer name | Copolymerization ratio (%) | a/a + b | c/c + d |
|---|---|---|---|---|---|---|---|
| Examples | 1 | — | — | — | — | 1 | 1 |
| | 2 | — | — | — | — | 0.8 | 1 |
| | 3 | — | — | — | — | 0.6 | 1 |
| | 4 | — | — | M10 | 25 | 1 | 0.75 |
| | 5 | — | — | M10 | 40 | 1 | 0.6 |
| | 6 | — | — | M10 | 15 | 0.82 | 0.85 |
| | 7 | M8 | 10 | M10 | 40 | 1 | 0.5 |
| | 8 | M8 | 15 | M10 | 40 | 1 | 0.45 |
| | 9 | M8 | 20 | M10 | 40 | 1 | 0.4 |
| | 10 | M8 | 15 | M10 | 35 | 0.1 | 0.5 |
| | 11 | M9 | 10 | M10 | 10 | 0.44 | 0.8 |
| | 12 | — | — | M10 | 60 | 1 | 0.4 |
| | 13 | — | — | M10 | 25 | 1 | 0.75 |
| | 14 | M9 | 10 | M10 | 10 | 1 | 0.8 |
| | 15 | M9 | 10 | M10 | 10 | 0.19 | 0.8 |
| | 16 | — | — | M10 | 20 | 0.5 | 0.8 |
| Comparative Examples | 1 | — | — | M10 | 25 | 0 | 0.75 |
| | 2 | — | — | M10 | 100 | — | 0 |
| | 3 | — | — | — | — | 0 | 1 |

Monomer name:
M9: sebacic dichloride
M10: triphosgene (its copolymerization ratio is expressed in terms of phosgene)

TABLE 3

| Table 2 | | Tg(° C.) | Molecular weight | nd | vd | Vd + 112*nd |
|---|---|---|---|---|---|---|
| Examples | 1 | 134 | 31000 | 1.582 | 36.1 | 213.284 |
| | 2 | 131 | 35000 | 1.590 | 35.0 | 213.080 |
| | 3 | 128 | 38000 | 1.594 | 33.9 | 212.428 |
| | 4 | 146 | 51000 | 1.588 | 34.8 | 212.656 |
| | 5 | 153 | 53000 | 1.590 | 34.0 | 212.080 |
| | 6 | 138 | 52000 | 1.586 | 35.4 | 213.032 |
| | 7 | 142 | 58000 | 1.585 | 34.2 | 211.720 |
| | 8 | 135 | 57000 | 1.583 | 34.5 | 211.796 |
| | 9 | 127 | 58000 | 1.581 | 35.0 | 212.072 |
| | 10 | 122 | 55000 | 1.597 | 32.1 | 210.964 |
| | 11 | 123 | 53000 | 1.596 | 33.2 | 211.952 |
| | 12 | 164 | 45000 | 1.596 | 32.8 | 211.552 |
| | 13 | 162 | 41000 | 1.604 | 33.2 | 212.848 |
| | 14 | 140 | 38000 | 1.587 | 36.0 | 213.744 |
| | 15 | 108 | 42000 | 1.593 | 32.1 | 210.516 |
| | 16 | 132 | 48000 | 1.587 | 32.8 | 210.544 |
| Comparative Examples | 1 | 140 | 48000 | 1.603 | 30.9 | 210.436 |
| | 2 | 183 | 59000 | 1.597 | 29.9 | 208.764 |
| | 3 | 136 | 38000 | 1.578 | 36.3 | 213.036 |

As can be seen from Comparative Examples 1 to 3, the highly refractive, thermoplastic resins such as conventional polyposphonate resin or modified polycarbonate resin have an Abbe number of less than 32 or a refractive index of less than 1.58, and are unsatisfactory for optical uses, particularly in eyeglass lenses. On the other hand, it appears that the resins in Examples 1 to 16 are excellent thermoplastic optical resins having both high Abbe number and high refractive index.

INDUSTRIAL APPLICABILITY

According to the present invention, there can be provided a resin having properties such as high refractive index and low dispersibility. The resin of the present invention can be used not only in various fields such as general-purpose molded products and films but also in particularly lenses or optical films thereby further demonstrating its further excellent effect.

The invention claimed is:

1. A resin comprising both (1) a phosphorus-containing residue having a bicycloalkyl structure represented by the following general formula (2):

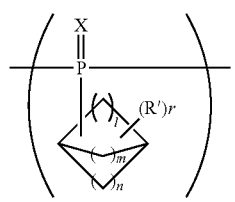

(2)

wherein l, m and n independently represent an integer of 1 to 4, X represents oxygen, sulfur, selenium or a pair of non-covalent electrons; the substituent R' is selected from the group consisting of a hydrogen atom, a C1 to C20 aliphatic hydrocarbon group, a C1 to C20 aromatic hydrocarbon group and a halogen atom; and r is an integer of 0 to 4, and (2) a divalent phenol residue represented by the following general formula (1):

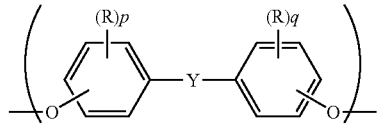

(1)

wherein Rs are independently selected from the group consisting of a hydrogen atom, a C1 to C20 aliphatic hydrocarbon group, a C1 to C20 aromatic hydrocarbon group, a halogen atom and a nitro group; each of p and q is an integer satisfying the equation: p+q=0 to 8; and Y is a group selected from the group consisting of an alkylidene group, a branched chain-containing alkylidene group, a cycloalkylidene group and a branched chain-containing cycloalkylidene group.

2. The resin according to claim 1, comprising:
the phosphorus-containing residue represented by the general formula (2);
a phosphorus-containing residue represented by the following general formula (3):

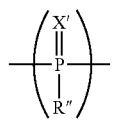

(3)

wherein R" represents an organic group other than the bicycloalkyl group represented by the general formula (2), and X' represents oxygen, sulfur, selenium or a pair of non-covalent electrons; and
the divalent phenol residue represented by the general formula (1), wherein the mol fraction of the phosphorus-containing residue represented by the general formula (2) and the phosphorus-containing residue represented by the general formula (3) satisfies the following relationship (I):

$$1 \geq (a)/\{(a)+(b)\} \geq 0.05 \quad (I)$$

wherein (a) represents the number of moles of the phosphorus-containing residue having a bicycloalkyl structure, and (b) represents the number of moles of the phosphorus-containing residue represented by the general formula (3).

3. The resin according to claim 2, which comprises the phosphorus-containing residue represented by the general formula (2), the phosphorus-containing residue represented by the general formula (3) below, the divalent phenol residue represented by the general formula (1), and other acid residues, wherein the mol fraction of all the phosphorus-containing residues and the other acid residues satisfies the following relationship (II):

$$1 \geq (c)/\{(c)+(d)\} \geq 0.05 \quad (II)$$

wherein (c) represents the number of moles of all the phosphorus-containing residues in total and (d) represents the number of moles of the other acid residues in total.

4. The resin according to claim 3, wherein the other acid residues contain a carbonic acid residue and/or a divalent carboxylic acid residue.

5. The resin according to claim 4, wherein the divalent carboxylic acid residue is an aliphatic dicarboxylic acid residue.

6. The resin according to claim 5, wherein the number of carbons in the aliphatic dicarboxylic acid residue is 8 or more.

7. The resin according to claim 1, wherein the Abbe number (vd) that is an indicator of the light dispersibility of the resin and represented by the equation (III) is 32 or more:

$$\text{Abbe number}(vd) = (nd-1)/(nf-nc) \tag{III}$$

wherein nd is a d line (wavelength 587.6 nm) refractive index, nf is a f line (wavelength 486.1 nm) refractive index, and nc is a c line (wavelength 656.3 nm) refractive index.

8. The resin according to claim 1, wherein the Abbe number (vd) as an indicator of the light dispersibility of the resin and the d line (nd) refractive index of the resin are 1.58 or more, and the value represented by the following formula (IV) is 210.5 or more, $$(vd) + 112 \times (nd) \tag{IV}$$

9. A molded product comprising the resin according to claim 1.

10. An optical lens comprising the molded product according to claim 9.

11. A film comprising the molded product according to claim 9.

* * * * *